United States Patent [19]
Ninomiya

[11] Patent Number: 5,745,168
[45] Date of Patent: Apr. 28, 1998

[54] HOLE-SIZE MEASURING SYSTEM FOR CRT BLACK MATRIX LAYER

[75] Inventor: Takafumi Ninomiya, Shiga, Japan

[73] Assignee: NEC Corporation, Tokyo, Japan

[21] Appl. No.: 592,202

[22] Filed: Jan. 26, 1996

[30] Foreign Application Priority Data

Jan. 26, 1995 [JP] Japan ................... 7-010495

[51] Int. Cl.⁶ .................................. H04N 17/00
[52] U.S. Cl. .............. 348/191; 348/92; 348/93; 348/180; 356/378; 382/144
[58] Field of Search ................... 348/180, 189, 348/190, 191, 61, 86, 92, 93, 125; 356/378, 379, 380, 384; 382/141, 144, 147, 199, 286; H04N 17/00

[56] References Cited

U.S. PATENT DOCUMENTS

| | | | |
|---|---|---|---|
| 3,636,362 | 1/1972 | Beeman et al. | 356/378 |
| 3,744,905 | 7/1973 | Smith | 356/378 |
| 3,746,455 | 7/1973 | Flamholz | 356/378 |
| 4,379,308 | 4/1983 | Kosmowski et al. | 348/126 |
| 4,417,274 | 11/1983 | Henry | 356/380 |
| 4,555,798 | 11/1985 | Broadbent, Jr. et al. | 382/144 |
| 5,432,549 | 7/1995 | Hassler et al. | 348/189 |
| 5,610,710 | 3/1997 | Canfield et al. | 356/378 |

FOREIGN PATENT DOCUMENTS 63-138628  6/1988  Japan ................. H01J 9/227

*Primary Examiner*—John K. Peng
*Assistant Examiner*—Jeffrey S. Murrell
*Attorney, Agent, or Firm*—Sughrue, Mion, Zinn, Macpeak & Seas, PLLC

[57] ABSTRACT

A hole-size measuring system that enables measurement of the size of individual holes of a black matrix layer of a CRT. This system includes an imaging device for producing an enlarged image of holes of a black matrix layer, and an image processor for electrically processing the image produced by the imaging device to measure a size of the holes. A CCD camera may be used as the imaging device. The CCD camera may have an automatic focusing function and is movable along a black matrix layer. For a color CRT, the holes are divided into three groups for red, green and blue colors, and the image processor has functions of measuring an average size of selected ones of the holes in the respective groups.

8 Claims, 4 Drawing Sheets

HOLE-SIZE MEASURING SYSTEM FOR CRT BLACK MATRIX LAYER

BACKGROUND OF THE INVENTION

1. Field of the Invention

The present invention relates to a hole-size measuring system for a black matrix layer and more particularly, to a measuring system for measuring the size of holes formed in a black matrix layer of a cathode-ray tube (CRT), a fluorescent material or materials being buried into the holes.

2. Description of the Prior Art

Typically, a color-generating CRT (color CRT) using a shadow mask has a face panel, a shadow mask fixed apart from the face panel on the inside of the face panel, and a black matrix fluorescent screen placed between the face panel and the shadow mask. The screen is formed on and along the inner surface of the face panel.

The black matrix fluorescent screen contains a black matrix layer having fine holes, and fine dots of three fluorescent materials for red (R), green (G) and blue (B) colors that are buried into the respective holes of the layer. The holes and dots are regularly arranged over the entire screen. The black matrix layer is made of a patterned optical blackening or light-absorbing material such as graphite formed on the inner surface of the face panel, which is provided to improve the contrast of the CRT. Each of the dots of the fluorescent materials usually has a circular, elliptic or slot-like shape according to the apertures of the shadow mask.

The black matrix layer is popularly produced by a precision photo-printing technique using a photo-sensitive material such as a photoresist.

Specifically, first, a photoresist film is formed on the inner surface of the face panel. Next, the photoresist film is exposed to light beams traveling through the apertures of the shadow mask, and is then developed. Thus, the photoresist film is patterned so that the exposed areas of the film are selectively left. The remaining areas of the film correspond to the dots of the RGB fluorescent materials, respectively.

Then, a layer of the blackening material is formed on the inner surface of the face panel to cover the remaining areas of the photoresist film, and is then developed. Thus, the layer of the blackening material is selectively removed in the above areas together with the remaining photoresist film therein. As a result, the layer of the blackening material is patterned to have fine holes formed at corresponding positions to the exposed areas, i.e., to the apertures of the shadow mask, thereby providing a black matrix layer.

The above exposure process of the above photoresist film is performed by using an exposure system, an example of which is described below referring to FIG. 1.

Subsequently, a film of a fluorescent material containing a photoresist is formed on the inner surface of the face panel to cover the remaining, patterned film (i.e., a matrix) of the blackening material. This film is then exposed to light passing through the apertures of the shadow mask and developed. Thus, fine dots of the fluorescent material are formed at corresponding positions to the fine holes of the film of the blackening material, respectively.

The film-formation, exposure and development processes of the fluorescent material are repeated three times in total for R, G and B fluorescent materials. As a result, the fine dots of the R, G and B colors are formed in the respective holes of the black matrix layer, thereby producing the above-described black matrix fluorescent screen.

An example of conventional exposure systems used for the above exposure process of the photoresist film is schematically illustrated in FIG. 1, which was disclosed in, for example, the Japanese Non-Examined Patent Publication No. 63-138628 published in June 1988.

As shown in FIG. 1, this system has a table 23 formed on the top of a body 20, a mercury (Hg) light source 24 fixed on the bottom of the body 20 in the body 20, an optical correction lens 25 placed between the table 23 and the light source 24 in the body 20, and a plate-like optical homogenizer 26 placed between the table 23 and the lens 25 in the body 20.

The table 23 is used for holding and positioning a face panel 21 thereon. The mercury light source 24 generates a light beam for exposure. The correction lens 25 corrects the irradiated position of the light beam. The homogenizer 26 homogenizes the light beam.

With the conventional exposure system of FIG. 1, an exposure process is performed in the following manner:

First, the face panel 21 having a photoresist film (not shown) formed on its inner surface and a shadow mask 22 held therein is prepared, Next, this panel 21 is placed onto the table 23 at a specified position, as shown in FIG. 1. Then, the mercury light beam is emitted upward from the light source 24. The light beam travels through the correction lens 25, the homogenizer 26, an opening 23a of the table 23, and the apertures of the shadow mask 22, and is irradiated on the photoresist film. Thus, the light beam produces a pattern of dots arranged in the photoresist film at corresponding positions to the apertures of the shadow mask 22.

The patterned photoresist film is then developed, thereby forming fine holes in the exposed areas. These holes are arranged over the entire inner surface of the panel 21.

The holes of the photoresist film thus formed, usually have the same size. However, the following problem occurs in the color CRTs each having a wide face panel and/or a short tube-length where electron beams need to be greatly deflected. Because the convergence of the electron beams varies depending upon the degree of its deflection, brightness of the fluorescent materials in the central part of the face panel 21 is different from that in the peripheral part thereof. In other words, the brightness is not uniform over the entire face panel 21.

To solve this problem relating to the uneven brightness, the holes in the central part of the face panel 21 (i.e., the black matrix layer) need to be different in size from those in the peripheral part thereof so that the brightness is uniform over the entire face panel 21. This means that the size of the holes is essentially controlled to realize the even brightness.

A conventional hole-size measuring system for this purpose is schematically shown in FIG. 2, which includes an illuminance sensor 28, an optical shielding member 27 having a cylindrical shape and is fixed to the sensor 28 at its top, and an illuminance meter 33 electrically connected to the sensor 28. The shielding member 27 prevents the sensor 28 from sensing external light.

In a measuring process of the conventional system of FIG. 2, the bottom of the shielding member 27 is contacted with the outer surface of the face panel 21 in its central part 21a. A black matrix layer 29 is formed on the inner surface of the panel 21. The shadow mask 22 is removed.

The sensor 28 receives the light beam passing through the black matrix layer 29 with the fine holes and the central part 21a of the face panel 21, and detects the illuminance of the beam. The data of the illuminance thus detected is then compared with the data that have been obtained before the formation process of the black matrix layer 29, resulting in an area ratio of the holes in the central part 21a.

On the other hand, the bottom of the shielding member 27 is contacted with the outer surface of the face panel 21 in its peripheral part 21b. The sensor 28 receives the light beam passing through the black matrix layer 29 and the peripheral part 21b of the face panel 21, and detects the illuminance of the beam. Then, another area ratio of the holes in the peripheral part 21b is obtained in the same manner as above.

Consequently, the average size of the holes of the black matrix layer 29 is measured in the parts 21a and 21b.

The size and shape of the holes of the black matrix layer 29 tend to vary due to the state of the photoresist film, the distribution of the apertures of the shadow mask 22, the light-emitting state of the mercury light 24 and so on. Accordingly, in the conventional measuring system of FIG. 2 where the total area of the holes of the layer 29 is obtained for the parts 21a and 21b using the illuminance data, a problem that only the average size of the holes in the respective parts 21a and 21b can be measured and that the size of the individual holes cannot be correctly measured. This means that this conventional measuring system cannot cope with the increase in CRT resolution.

SUMMARY OF THE INVENTION

Accordingly, an object of the present invention is to provide a hole-size measuring system that enables measuring the size of individual holes of a black matrix layer.

Another object of the present invention is to provide a hole-size measuring system that enables coping with the increasing resolution of a color CRT.

These objects together with others not specifically mentioned will become clear to those skilled in the art from the following description.

A hole-size measuring system for a black matrix layer according to the present invention includes an imaging device for producing an enlarged image of holes of a black matrix layer, and an image processor for electrically processing the image produced by the imaging device to thereby measure a size of the holes.

With the hole-size measuring system according to the invention, the imaging device produces an enlarged image of holes of the black matrix layer, and the image processor electrically processes the image thus produced to thereby measure a size of the holes. Therefore, not only an average size of the holes, but also the size of the individual holes can be measured.

Since the size of the individual holes is measured using the enlarged image of the holes, this hole-size measuring system can cope with the increasing resolution of a color CRT.

As the imaging device, any device may be used if it has a function of imaging a part or the entirety of the holes of the black matrix layer to produce an enlarged image of the holes.

As the image processor, any device or equipment may be used if it has a function of electrically processing the image produced by the imaging device to thereby measure a size of the holes existing in this image.

In a preferred embodiment of the invention, a charge-coupled device (CCD) camera is used as the imaging device. In this case, preferably, the CCD camera has an automatic focusing function and is movable along the black matrix layer. An advantage that a clear image of the holes at a specified point or points can be obtained independent of the size of a face panel of a CRT occurs. This leads to an automatic hole-size measurement.

In another preferred embodiment of the invention, the holes are divided into a first group for a red (R) color, a second group for a green (G) color, and a third group for a blue (B) color. The image processor has functions (or algorithms) for measuring an average size of selected ones of the holes in the first group, measuring an average size of selected ones of the holes in the second group, and measuring an average size of selected ones of the holes in the third group. An advantage of an increased processing speed of the image processor can be obtained.

In a further preferred embodiment of the invention, the image processor further contains a data base in which measured data of the holes are stored. An advantage is that the operation of this measuring system can be monitored and that this measuring system is available for quality control of the CRT.

BRIEF DESCRIPTION OF THE DRAWINGS

In order that the invention may be readily carried into effect, it will now be described with reference to the accompanying drawings.

DETAILED DESCRIPTION OF THE PREFERRED EMBODIMENTS

Preferred embodiments of the present invention will be described in detail below while referring to FIGS. 3 to 6.

Figure 1:
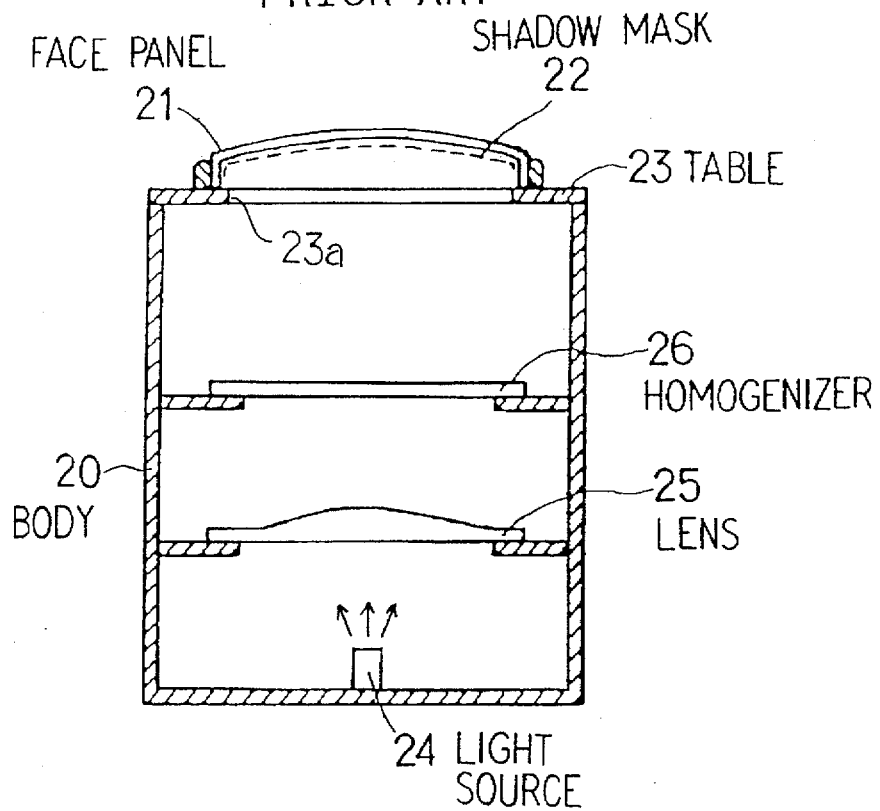
FIG. 1 is a schematic cross-section of a conventional exposure system used for forming the fine holes of a black matrix layer.
Figure 2:
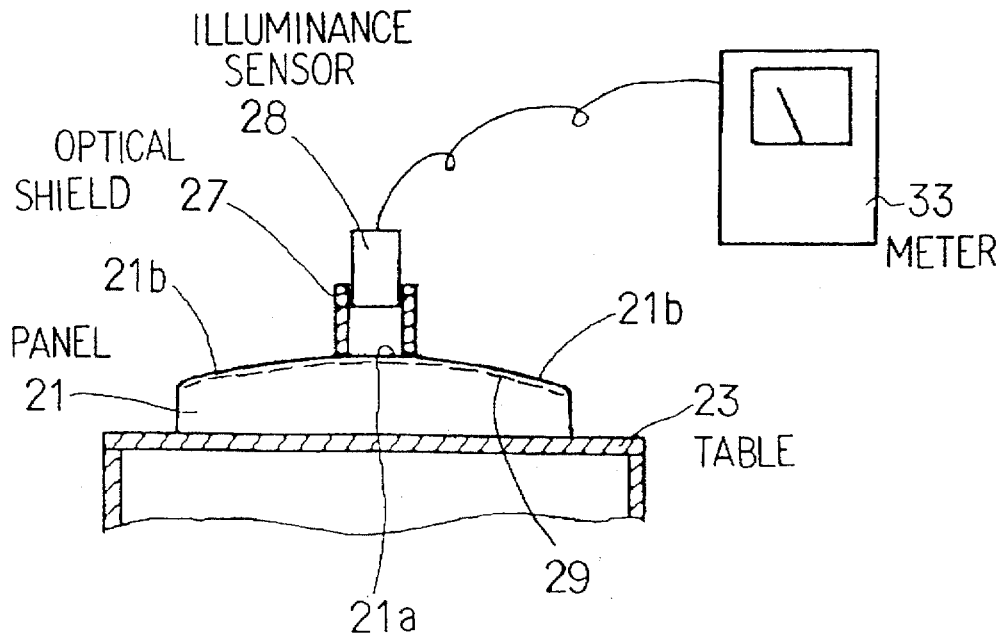
FIG. 2 is a schematic, partial, enlarged cross-section of a conventional hole-size measuring system used for measuring the hole size of a black matrix layer.
Figure 3:
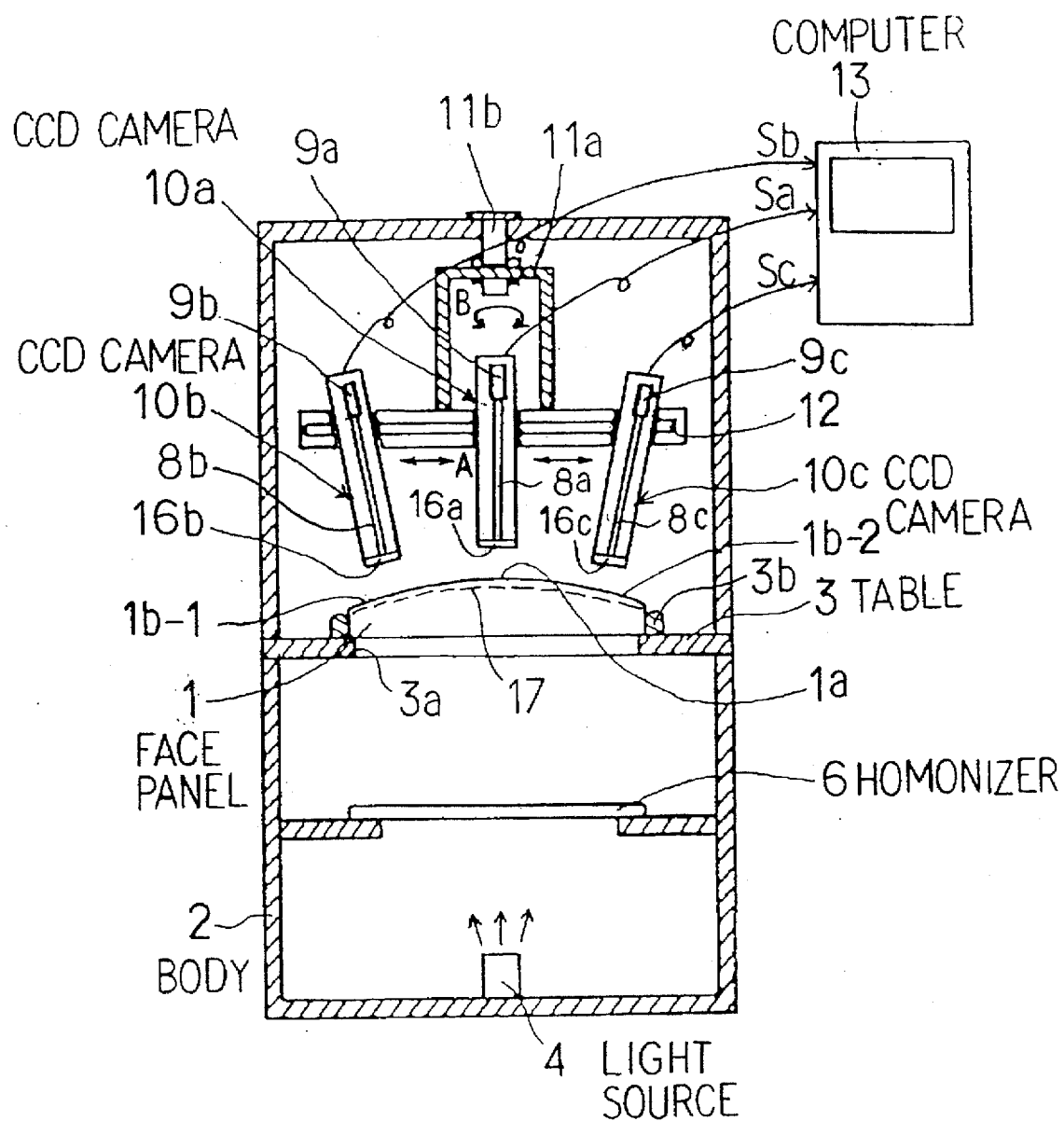
FIG. 3 is a schematic cross section of a hole-size measuring system used for measuring the hole size of a black matrix layer according to a first embodiment of the invention.

As shown in FIG. 3, a hole-size measuring system according to a first embodiment of the invention is equipped together with an exposure system. The exposure system has a table 3 fixed in a body 2. The table 3 has an opening 3a and is positioned in the approximately middle level of the body 2. The table 3 is used for holding and positioning a face panel 1 of a color CRT thereon. The face panel 1 has a black matrix layer 17 formed on its inner surface.

A mercury light source 4 generating a light beam for exposure is fixed in the body 2 at its bottom. A plate-like optical homogenizer 6 homogenizing the light beam is placed in the body 2 between the table 3 and the light source 4.

The hole-size measuring system has three CCD cameras 10a, 10b and 10c arranged in the upper space of the body 2 over the table 3 as imaging devices, and a personal computer 13 placed outside the body 2 as an image processor. The cameras 10a, 10b and 10c are used for producing images of a part of the holes of the black matrix layer 17, respectively. The computer 13 is used for electrically processing the images thus produced to thereby measure the size of the holes.

The cameras 10a, 10b and 10c are supported by an elongated supporting member 12 that extends horizontally in the body 2. The two cameras 10b and 10c placed at each end of the member 12 can be moved horizontally along arrows A by a sliding mechanism of the member 12. The camera 10a placed on the center of the member 12 is fixed onto the member 12 and cannot be moved horizontally.

The supporting member 12 is fixed on its center to the bottom end of a cylindrical supporting member 11a. The longitudinal axis of the member 11a extends vertically.

A shaft 11b is fixed at its upper end to the top of the body 2. The shaft 11b is connected at its lower end to the supporting member 11a. The member 11a can be turned or rotated around the shaft 11b along an arrow B, so that the supporting member 12 and the cameras 10a, 10b and 10c are also turned around the shaft 11b in a horizontal plane.

The camera 10a has an optical lens 16a disposed at its lower end, a driving motor 9a disposed near its upper end, and a ball screw 8a engaged with the lens 16a and the motor 9a. The ball screw 8a is rotated by the motor 9a to thereby shift the position of the lens 16a upward or downward. Thus, automatic focusing function of the camera 10a is realized.

Figure 4:
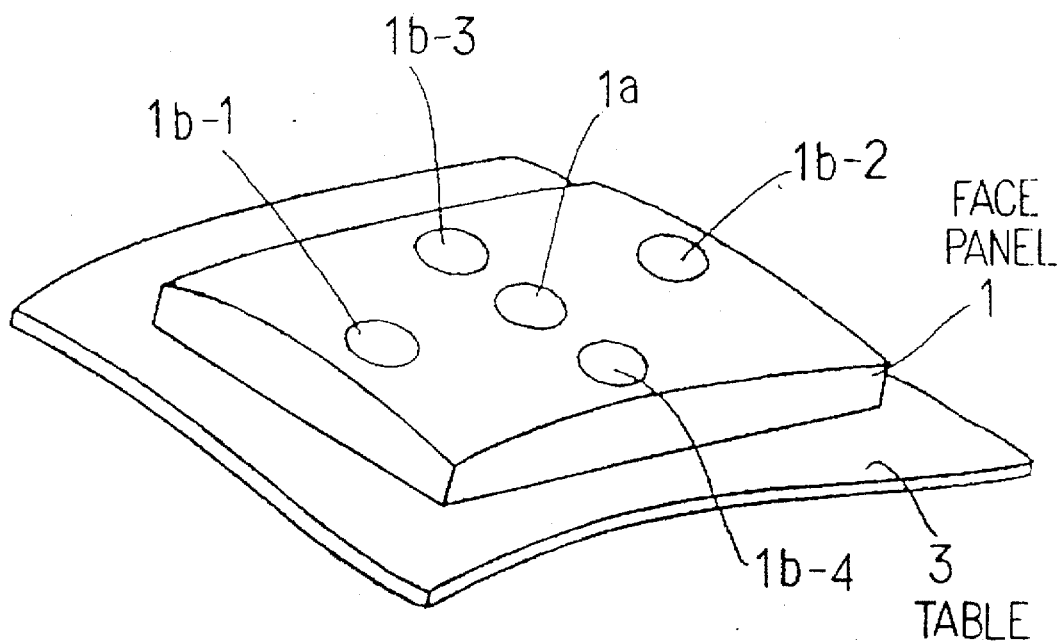
FIG. 4 is a schematic, perspective view of a face panel positioned on a table of the hole-size measuring system according to the first embodiment.

In the first embodiment, the camera 10a produces an image of the holes of the black matrix layer 17 in a central area 1a of the face panel 1, as shown in FIG. 4.

Similarly, the camera 10b has an optical lens 16b disposed at its lower end, a driving motor 9b disposed near its upper end, and a ball screw 8b engaged with the lens 16b and the motor 9b. The ball screw 8b is rotated by the motor 9b to thereby shift the position of the lens 16b upward or downward. Thus, automatic focusing function of the camera 10b is realized.

As shown in FIG. 4, the camera 10b produces images of the holes of the black matrix layer 17 in first and third peripheral areas 1b-1 and 1b-3 of the face panel 1.

Further, the camera 10c has an optical lens 16c disposed at its lower end, a driving motor 9c disposed near its upper end, and a ball screw 8c engaged with the lens 16c and the motor 9c. The ball screw 8c is rotated by the motor 9c to thereby shift the position of the lens 16c upward or downward. Thus, automatic focusing function of the camera 10c is realized.

The camera 10c produces images of the holes of the black matrix layer 17 in second and fourth peripheral areas 1b-2 and 1b-4 of the face panel 1.

The personal computer 13 placed outside the body 2 is electrically connected to the cameras 10a, 10b and 10c. Image data signals Sa from the camera 10a, Sb from the camera 10b and Sc from the camera 10c are supplied to the computer 13 for an image processing purpose.

With the hole-size measuring system according to the first embodiment, the hole-size of the black matrix layer 17 is measured in the following manner:

First, the three CCD cameras 10a, 10b and 10c are positioned as shown in FIG. 3 and then, they take photographs of the holes of the black matrix layer 17 in the central area 1a and the first and second peripheral areas 1b-1 and 1b-2. Thus, the images of the holes in the areas 1a, 1b-1 and 1b-2 are produced. The image data corresponding to the three images are sent to the computer 13 as electric signals Sa, Sb and Sc from the cameras 10a, 10b and 10c.

Next, the CCD cameras 10b and 10c at each end of the supporting member 12 are turned by 90° around the shaft 11b (along the arrow B) using the supporting members 12 and 11a. Then, they take photographs of the holes of the black matrix layer 17 in the third and fourth peripheral areas 1b-3 and 1b-4. Thus, the images of the holes in the areas 1b-3 and 1b-4 are produced. The image data corresponding to the two images also are sent to the computer 13 as the electric signals Sb and Sc from the cameras 10b and 10c.

The image data corresponding to the five images thus produced in the central area 1a, and the first to fourth peripheral areas 1b-1, 1b-2, 1b-3 and 1b-4 are processed in the computer 13, so that the edges or contours of the individual holes are sharpened or clarified using a known algorithm. The sharpened images facilitate the measuring process of the individual hole.

Figure 5:
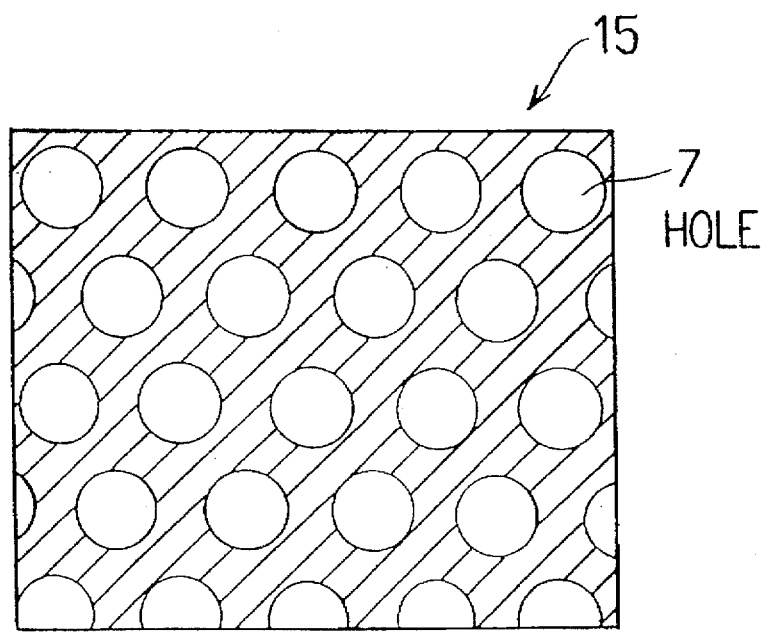
FIG. 5 is a partial, schematic view of an enlarged and sharpened image of the holes produced by the hole-size measuring system according to the first embodiment.

FIG. 5 schematically shows a sharpened image 15, in which each hole 7 is clearly represented. In FIG. 5, for example, the diameter of each hole 7 is approximately 100 μm. On the other hand, each of the areas 1a, 1b-1, 1b-2, 1b-3 and 1b-4 has a circular shape whose diameter is approximately 1 mm.

Subsequently, three holes 7 are sampled for each color in the respective images obtained in the areas 1a, 1b-1, 1b-2, 1b-3 and 1b-4, and image-processed. Thus, an equivalent average size or diameter of the selected three holes 7 for each color is obtained. This image processing operation improves the processing speed of the computer 13 and enables the correct measurement of the size of the holes 7.

Although three holes 7 are sampled for each color here, it is needless to say that four or more holes 7 may be sampled. However, in this case, a higher performance and a faster image-processing speed is required for the computer 13. Therefore, the number of samples should be decided considering these points.

Since each of the CCD cameras 10a, 10b and 10c has the automatic focusing function and the cameras 10b and 10c can be shifted in position horizontally, the images of the holes 7 can be always taken clearly, independent of the size of the face panel 1. This means that the hole-size measuring system according to the first embodiment is available for various types of CRTs.

Also, this measuring system enables realization of the automatic hole-size measurement if the position, movement and shutter timing of the cameras 10a, 10b and 10c are controlled by a process control computer together with the exposure process.

Figure 6:
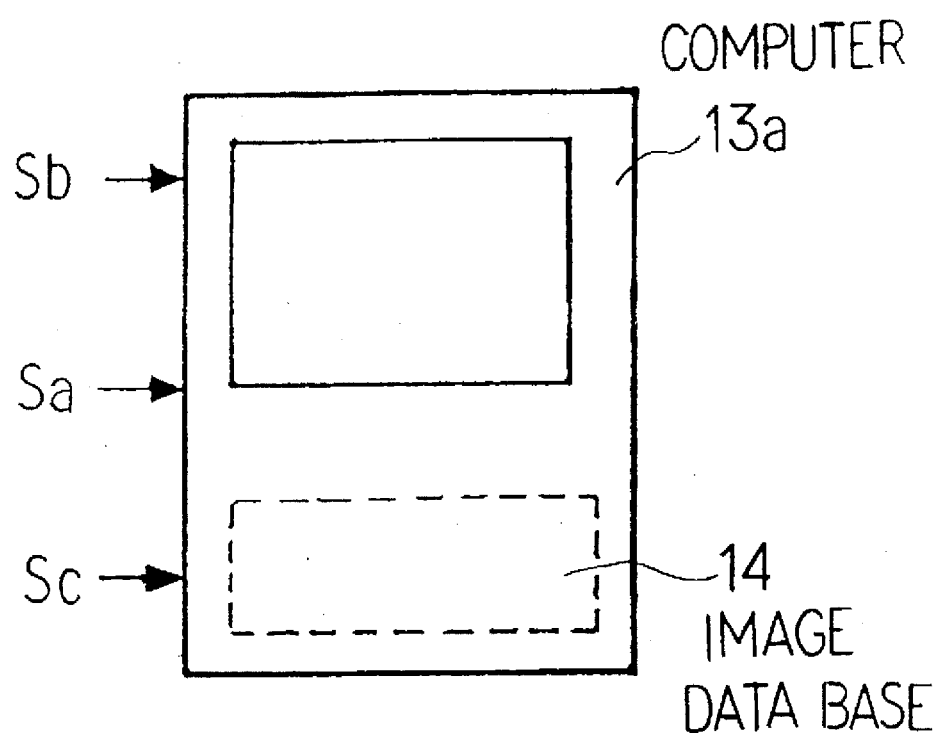
FIG. 6 is a schematic view of an image processor used for a hole-size measuring system according to a second embodiment.

FIG. 6 shows a personal computer 13a used for a hole-size measuring system according to a second embodiment. The computer 13a has the same configuration and performance as those of the computer 13 in the first embodiment other than that an image data base 14 is provided therein. The various image data obtained through the hole-size measuring processes are stored in the data base 14.

With the hole-size measuring system according to the second embodiment, the various image data obtained through the measuring processes are always stored in the data base 14, and the stored data can be readily taken out as required. Therefore, the process-management data can be readily and correctly searched, which facilitates the control of the hole-size measuring system itself and quality of the CRT.

The system according to the second embodiment facilitates the data processing such as transition of the measured hole size, extraction of inferior or poor face-panels 1, search for hole-size measurement errors, search for bar-code data, and so on.

In the above first and second embodiments, although the equivalent average size or diameter of the holes 7 is measured using the three CCD cameras 10a, 10b and 10c in the five areas 1a, 1b-1, 1b-2, 1b-3 and 1b-4, the invention is not limited thereto. Only one CCD camera may be equipped to be moved along the face panel 1. A large number of CCD cameras may be arranged in the same plane, and all of the cameras take photographs of the holes in the corresponding areas to the respective cameras at the same time.

The number of the areas where the photographs are taken is preferably five or more (for example, nine, eighteen, . . .).

Any algorithm of the image data operation other than that described above may be employed in consideration with the shape of the holes 7 or the like.

Further, the circular holes 7 are formed in the black matrix layer 17 in the above embodiments. However, needless to say, the holes 7 may be of an elliptic or a slot-like shape. In this case, longer and shorter diameters of the ellipsoid or longer and shorter sides of the slot are measured.

While the preferred forms of the present invention have been described, it is to be understood that modifications will be apparent to those skilled in the art without departing from the spirit of the invention. The scope of the invention, therefore, is to be determined solely by the following claims.

What is claimed is:

1. A hole-size measuring system for a black matrix layer, comprising:

an imaging device being slidably and rotatable provided to cover a surface of the black matrix layer and produce an enlarged image of holes of the black matrix layer; and an image processor for electrically processing said image to thereby measure a size of said holes.

2. A system as claimed in claim 1, wherein a CCD camera is used as said imaging device;

and wherein said CCD camera has an automatic focusing function and is movable along said black matrix layer.

3. A system as claimed in claim 1, wherein said holes are divided into a first group for a red color, a second group for a green color, and a third group for a blue color;

and wherein said image processor has functions of measuring an average size of selected ones of said holes in said first group, measuring an average size of selected ones of said holes in said second group, and measuring an average size of selected ones of said holes in said third group.

4. A system as claimed in claim 1, wherein said image processor further contains a data base in which measured data of the size of said holes are stored.

5. A hole-size measuring system for a black matrix layer, comprising:

a plurality of imaging devices for producing enlarged images of different parts of the black matrix layer, a portion of said plurality of imaging devices being slidably and rotatably provided to cover a surface of said black matrix layer, each of said images containing holes of said black matrix layer; and an image processor for electrically processing said enlarged images to thereby measure a size of said holes contained in each of said images.

6. A system as claimed in claim 5, wherein said image processor further contains a data base in which measured data of a size of said holes are stored.

7. A hole-size measuring system for a black matrix layer, comprising:

a plurality of imaging devices for producing enlarged images of different parts of the black matrix layer, each of said images containing holes of said black matrix layer; and an image processor for electrically processing said enlarged images to thereby measure a size of said holes contained in each of said images;

wherein CCD cameras are used as said plurality of imaging devices; and wherein each of said CCD cameras has an automatic focusing function and is movable along said black matrix layer.

8. A hole-size measuring system for a black matrix layer, comprising:

a plurality of imaging devices for producing enlarged images of different parts of the black matrix layer, each of said images containing holes of said black matrix layer; and an image processor for electrically processing said enlarged images to thereby measure a size of said holes contained in each of said images;

wherein said holes contained in each of said images are divided into a first group for a red color, a second group for a green color, and a third group for a blue color; and wherein said image processor has functions of measuring an average size of selected ones of said holes in said first group, measuring an average size of selected ones of said holes in said second group, and measuring an average size of selected ones of said holes in said third group.

* * * * *